United States Patent [19]

Marsch et al.

[11] 4,165,793

[45] Aug. 28, 1979

[54] PIVOTAL SUPPORT FOR VEHICLE DRIVE LINE HAVING THREE UNIVERSAL JOINTS

[75] Inventors: James E. Marsch, Brookfield; David C. Quick, New Berlin, both of Wis.

[73] Assignee: Allis-Chalmers Corporation, Milwaukee, Wis.

[21] Appl. No.: 863,452

[22] Filed: Dec. 22, 1977

[51] Int. Cl.² ............................................. B60K 17/34
[52] U.S. Cl. .................................................... 180/233
[58] Field of Search ............... 180/51, 52, 53 D, 43 R

[56] References Cited

U.S. PATENT DOCUMENTS

| | | | |
|---|---|---|---|
| 1,142,190 | 6/1915 | Miller | 180/43 R |
| 3,159,229 | 12/1964 | Thwaites | 180/51 |
| 3,568,788 | 3/1971 | Mayeaux | 180/51 |
| 3,630,302 | 12/1971 | Holland | 180/51 |
| 4,081,046 | 3/1978 | Stone | 180/52 |

Primary Examiner—John P. Silverstrim
Attorney, Agent, or Firm—Arthur L. Nelson

[57] ABSTRACT

A pivotal support for a vehicle drive line of an articulated vehicle using gimbal rings supporting two universal joints and equally dividing angularity of these two joints and controlling the angularity of a third universal joint of the drive line.

10 Claims, 5 Drawing Figures

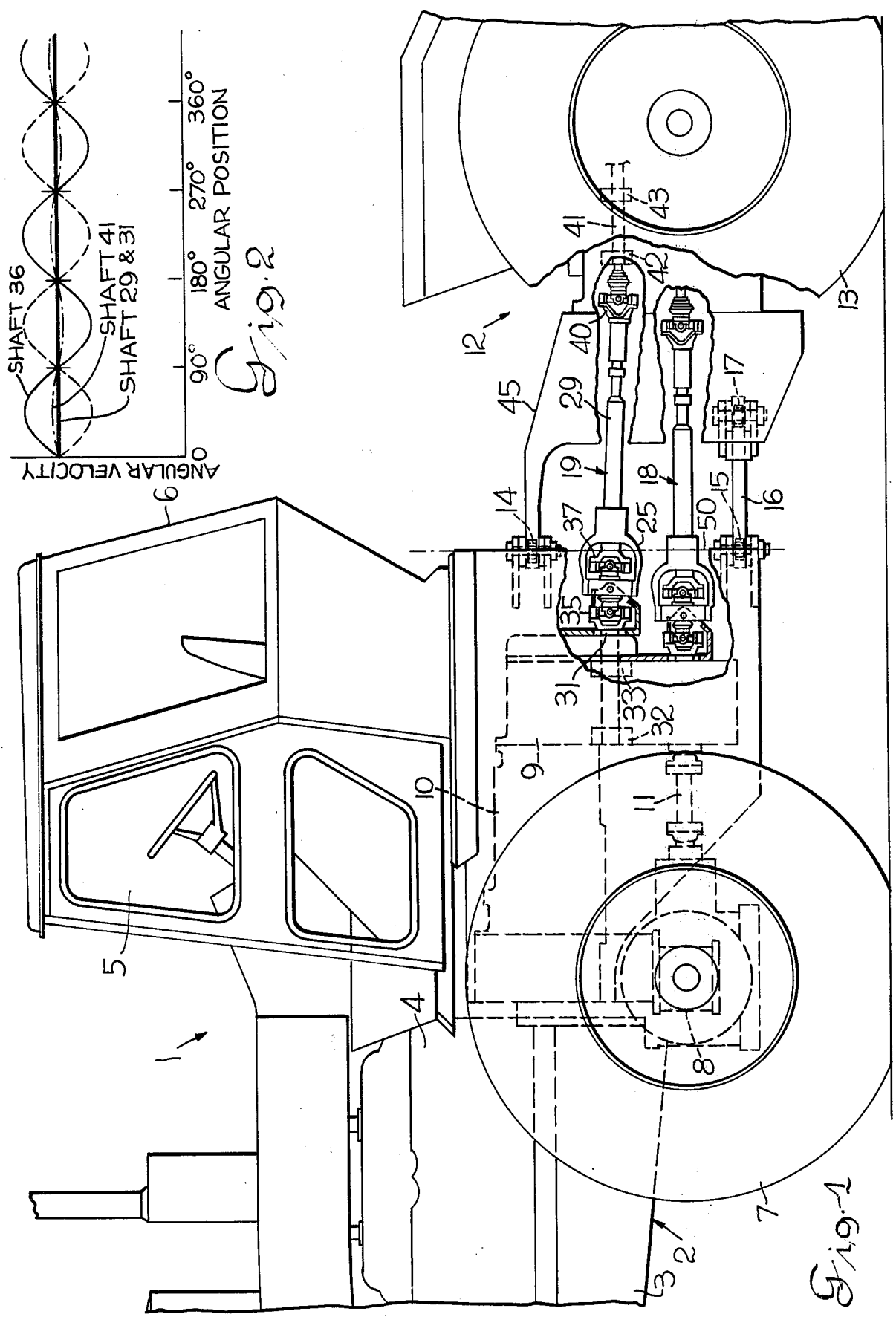

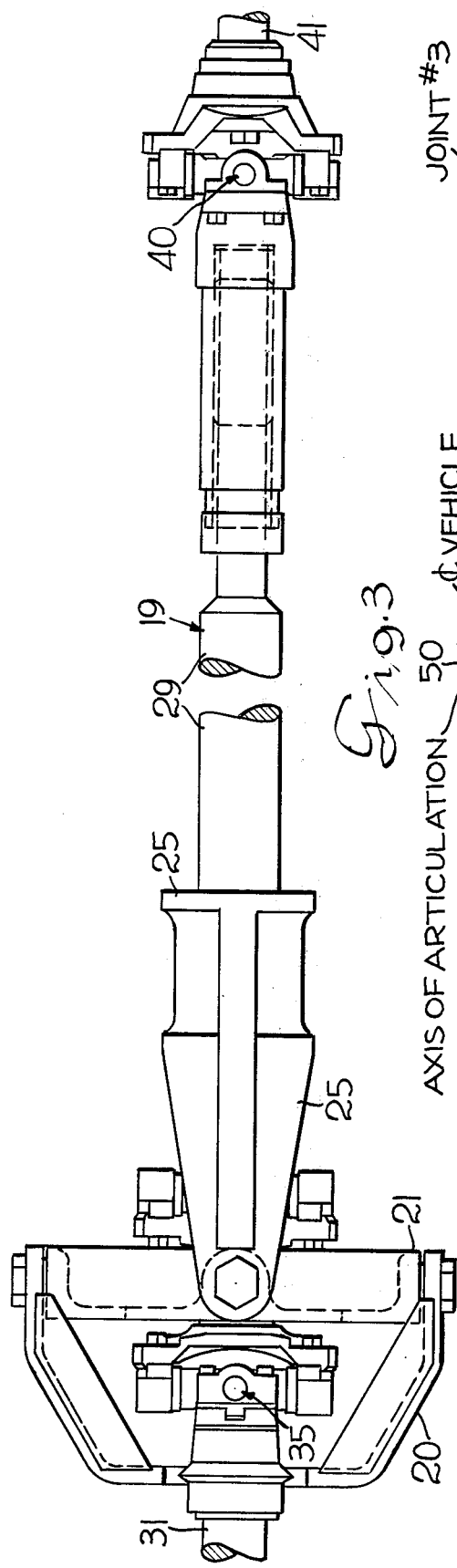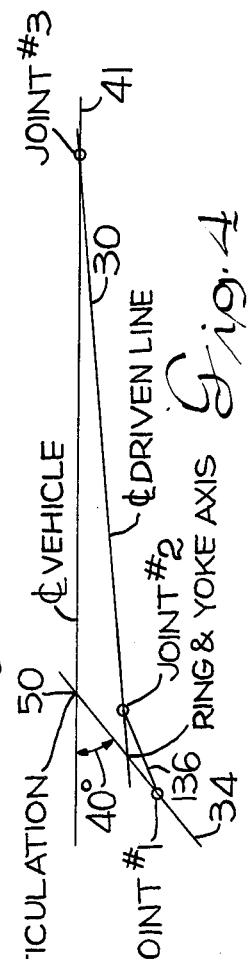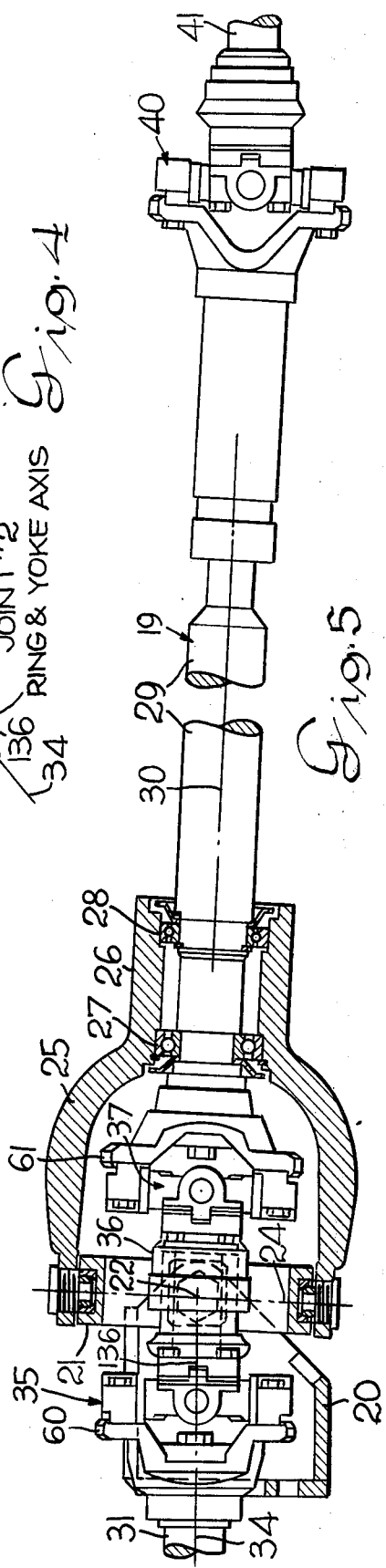

PIVOTAL SUPPORT FOR VEHICLE DRIVE LINE HAVING THREE UNIVERSAL JOINTS

This invention relates to a drive line for an articulated vehicle and more particularly to gimbal ring support for a portion of the drive line to distribute the angle of articulation between the three universal joints on the drive line.

A drive line of an articulated vehicle must compensate for the articulation between the front and rear frames of the vehicle. Accordingly, universal joints adapt the drive line for pitch, roll and yaw of the one frame relative to the other for transmission of power from the frame carrying the engine to the drive wheels fore and aft. The angle of articulation is the primary concern since articulation can be quite substantial and the total angle of articulation must be distributed among the universal joints to avoid excessive angularity of any part of the drive line. Various means have been provided to compensate for the articulation of the vehicle without complete satisfaction of overcoming the problem. The drive line for the four wheel drive vehicle is transmitted through a drop box with a drive line extending forward to the front wheels and a drive line extending rearwardly to the rear wheels. The vehicles having an engine on the front frame with a drive line to the front wheels usually does not present any real problem since the drive line is not required to bend excessively in transmission of the power to front wheel drive. The rear wheel drive line, however, can present more serious problems since the front and rear frames articulate relative to each other. A suitable supporting structure which will distribute the angularity of the articulating joint can be provided to distribute the total angle of articulation across the three universal joints. Although the drive line for the rear wheels does present a problem, an even more serious problem is the inertia forces which are set up in a drive line for the power takeoff shaft which rotate at a higher angular velocity. Since the drive line for driving the rear wheels rotates at a much lower angular velocity than the power takeoff shaft, the inertia problems in that drive line are not as apparent. With the higher speeds of the power takeoff shaft (running at engine rpm), these inertia forces can present a problem. Accordingly, the total angle of articulation must be distributed among the three universal joints with equal angular distribution between the front two universal joints to provide proper phasing to cancel out angular acceleration and deceleration across the universal joints to provide a constant velocity drive speed on the shaft between the second and third universal joints. The angularity of the third universal joint is limited so that the resultant accelerating and decelerating forces on the output are not objectionable. This avoids the severe accelerating and decelerating effects of a Cardan U-joint used on a high speed and high angularity drive line.

Accordingly, this invention provides for a drive line which may be used for driving of the rear wheels or may also adapt itself to use in the power takeoff shaft which transmits torque at a much higher speed. The front two universal joints are supported from the front frame and on a gimbal ring mount supporting the shaft immediately behind the first two universal joints. The support of the shaft (between the second and third universal joints) on the gimbal ring mount is such that the front two universal joints are positioned equidistant from the axes of the gimbal ring. This allows the drive line to run freely, and the angle between the first and second joint is equally divided by a support of this type. The front drive shaft is supported on the front frame and the other drive shaft is also supported from the front frame through the gimbal ring. The other drive shaft extends rearwardly to drive through a third universal joint and a portion of the articulation angle is compensated for by the third universal joint as well as pitch and roll between the front frame and rear frame. Accordingly, this invention provides a means whereby the inertia forces and the problems as a result of angularity of the drive line are reduced to a minimum.

It is an object of this invention to provide a pivotal support for the drive line on gimbal rings supported on one frame of an articulated vehicle.

It is another object of this invention to provide a universal support of the drive line on an articulated vehicle for distribution of the total angle of articulation over the three universal joints in the drive line.

It is a further object of this invention to provide gimbal ring supports on the front frame of an articulated vehicle for supporting the two front universal joints in the drive line for distribution of the majority of the articulating angle between the two universal joints and a third universal joint supported on the rear frame of the articulated vehicle to provide overall distribution of an angle of articulation and compensation for relative roll between the two frames of the articulated vehicle.

It is a further object of this invention to provide a support of the two front universal joints which equally divides the angularity of these two joints.

The objects of this invention are accomplished on an articulated vehicle by providing a drive line having three universal joints to compensate for pitch, yaw and roll of the one frame relative to the other of the vehicle. The angle of articulation is distributed between the three universal joints by universally mounting the shaft intermediate the second and third universal joints. The mounting of the shaft of the gimbal ring is such to position the front two universal joints equidistant from the axes of the gimbal ring. This mounting of the shaft divides the angularity of the two front universal joints equally and permits the drive shaft to move universally as well to compensate for relative movement between the two frames. The third universal joint also permits universal movement between this shaft and the shaft mounted on the rear frame to further distribute the angle of articulation and roll between the front and rear frames to reduce the maximum angularity of any one of the universal joints. Cardan universal joints are used in the drive line with gimbal ring supports to provide equal angularity of the front two universal joints which cancel accelerating and decelerating forces in the drive line. The third universal joint has limited angularity so that the angular acceleration and deceleration in this portion of the drive line is not objectionable. This provides a smooth transition of power from the input to the output of the drive line.

The preferred embodiment of this invention is illustrated on the attached drawings.

FIG. 1 illustrates a side elevation view of an articulating vehicle with drive lines extending fore and aft and a power takeoff drive line extending to the rear of the vehicle;

FIG. 2 is a graph showing the angular velocity versus time relationship of the shafts and universal joints producing accelerating and decelerating velocities in the drive line;

FIG. 3 is a plan view of the drive line showing a three universal joint drive line;

FIG. 4 is geometric plan view of the centerlines of the components and their function in the drive line assembly; and FIG. 5 is a side elevation view of the drive line having three universal joints.

Referring to the drawings, the articulated vehicle and the supporting structure for the drive line is shown. The articulated vehicle 1 includes the front bogie 2 including the front frame 3 supporting the engine 4. The operator's station 5 is defined by the cab 6 mounted on the front frame 3. The front wheels support the front bogie 2 of which one wheel 7 is shown. The front axle 8 is fixed to the front frame 3 to maintain the stability of the vehicle. The engine 4 drives through a drop box 9 of the transmission 10. The front drive line 11 drives the front wheels.

The rear wheels support the rear bogie 12 of which one wheel 13 is shown. The rear bogie 12 is pivotally connected to the front bogie 2 through the articulating bearings 14 and 15. The link 16 connected through bearing 15 pivotally connects through the articulating bearing 17 to the rear bogie. The bearings 14, 15 and 17 are spherical bearings and the link 16 permits a degree of roll between the front and rear frame.

The rear drive line 18 drives the rear wheels. The power takeoff line 19 drives through to the rear bogie 12 for driving of an implement.

Referring to FIGS. 3 and 5, the power takeoff line per se is shown. The bracket 20 is mounted on drop box 9 of the front bogie 2 and carries the gimbal ring 21. The gimbal ring 21 is supported on a horizontal axis 22. The yoke 25 is supported on an axis 24 normal to axis 22. The yoke 25 extends rearwardly to form the sleeve 26. The sleeve 26 carries the bearings 27 and 28 to rotatably support the drive shaft 29 for rotating about an axis 30.

The drive shaft 31 is rotatably mounted in the bearings 32 and 33 on drop box 9 of the front bogie 2. The drive shaft 31 rotates about the axis 34 and is connected by yoke 60 to the universal joint 35. The connecting shaft 36 defines an axis 136 and connects the universal joint 35 with the universal joint 37. The universal joint 37 is connected to the driven shaft 29 by yoke 61.

FIG. 4 shows a plan view of the drive line showing the universal joints pivoted with equal distribution of angles between the shafts 29 and 31. This relationship is maintained because each universal joint is equidistant from the axes of the gimbal ring 21.

The driven shaft 29 extends to the rear universal joint 40. Universal joint 40 is connected to the output shaft 41 which drives the rear drive assembly for the power takeoff. The universal joint 40 compensates for relative roll and pitch of the two frames and also compensates for a portion of the articulation of the vehicle and operates under relatively small angularity. The output shaft 41 is rotatably mounted in bearings 42 and 43 which are supported on the rear frame 45 of the rear bogie 12.

FIG. 2 shows the angular velocity versus angular position relationship. Considering shaft 31 at a relatively constant angular velocity, the angular velocity of the connecting shaft 36 will increase and decrease in a sinusoidal manner as shown due to the Cardan joint 35. The same sinusoidal relationship would exist across universal joint 37 but 90 degrees out of phase. Accordingly, the acceleration and deceleration of the universal joints is cancelled out and shaft 29 operates at the same constant angular velocity as shaft 31.

The operation of the device will be described in the following paragraphs.

The engine 4 of the articulated vehicle drives through the transmission 10 and the drop box 9. Power is transmitted to the rear bogie 12 through the power takeoff line 19 and the rear drive line 18. For the purpose of illustration, the power takeoff line 19 will be subsequently described. Generally the same problems which must be overcome in the power takeoff line are inherent in the drive line 18 although the power takeoff line rotates at a higher speed and has greater inertia forces. The bracket 20 is mounted on the front frame 3 and carries the gimbal ring 21. The yoke 25 which is integral with the bushing 26 is pivotally supported on the gimbal ring 21 and supports the drive shaft 29. Accordingly, a pivotal movement initiated by articulation of roll between the front and rear frame of the vehicle will cause a pivotal movement between the drive shaft 31 and driven shaft 29. The pivotal movement about the gimbal ring axes 22 and 24 will cause pivoting between each of the universal joints 35 and 37 and the angle is equally distributed between the two universal joints. The gimbal ring distributes the angle of articulation 50 between the universal joints and primarily between the first two universal joints. However, a lesser angularity is created on the rear universal joint 40.

Since the angle between drive shafts 29 and 31 is divided equally at the first two U-joints 35 and 37, accelerations at joint 35 are exactly cancelled by accelerations at 37, and the rotation of shaft 29 is uniform throughout its length. The inertia forces are reduced to a minimum by the uniform rotating velocity of the driven shaft 29 and the distribution of the angularity of the drive line between the three universal joints. The device avoids excessive angularity of any one universal joint and provides a control to distribute the angularity of articulation of the vehicle such that nonuniform rotating velocity, characteristic of Cardan U-joints, is minimized at the drive shaft 41.

The embodiments of the invention in which an exclusive property or privilege is claimed are defined as follows:

1. An articulated vehicle comprising a first bogie, a second bogie, articulating means pivotally connecting said first and second bogie of the vehicle, and a drive line adapted for transmission of power, said drive line including a drive shaft, bearing means rotatably supporting said drive shaft on said first bogie, another drive shaft, a first universal joint connected to said first shaft, a second universal joint connected to said other shaft, a connecting shaft connected between said universal joints for transmitting power through said drive line, a third universal joint connected to said other drive shaft, an output drive shaft connected to said third universal joint, a bearing on said other bogie rotatably supporting said output drive shaft, and a gimbal ring pivotally mounted on said first bogie for rotatably supporting said other drive shaft for equally dividing angularity between said first and said second universal joint.

2. An articulated vehicle having a drive line as set forth in claim 1 wherein said articulating means includes bearings permitting limited roll between said first and second bogies.

3. An articulated vehicle having a drive line as set forth in claim 1 wherein said first bogie includes the front frame of said vehicle, said second bogie includes the rear frame of said articulating vehicle.

4. An articulating vehicle having a drive line as set forth in claim 1 wherein said articulating means defines an axis lying behind said first and second universal joints.

5. An articulated vehicle having a drive line as set forth in claim 1 wherein said ring defines pivotal axes intersecting the centerlines of said drive shafts.

6. An articulated vehicle having a drive line as set forth in claim 1 wherein said gimbal ring defines two pivotal axes to allow two degrees of angular movement.

7. An articulated vehicle having a drive line as set forth in claim 1 including pivotal supports pivotally connected to said gimbal ring wherein said pivotal supports define pivotal axes intersecting a point equidistance from said universal joints.

8. An articulated vehicle having a drive line as set forth in claim 7 wherein said universal joints are aligned for equal angular operation to provide the same constant angular velocity of said other shaft as said drive shaft.

9. An articulated vehicle having a drive line as set forth in claim 1 wherein said connecting shaft defines a length approximately the diameter of said gimbal ring.

10. An articulated vehicle having a drive line as set forth in claim 1 wherein said first bogie includes a front frame of said articulated vehicle, said second bogie includes the rear frame of said articulated vehicle, said articulating means pivotally connecting said front and rear bogies defining a pivotal axis intermediate said second and third universal joint.

* * * * *